E. B. Bishop,

Dredger,

No. 3,028. Reissued July 14, 1868.

N. PETERS, PHOTO-LITHOGRAPHER, WASHINGTON, D. C.

UNITED STATES PATENT OFFICE.

E. B. BISHOP, OF NEW ORLEANS, LOUISIANA.

IMPROVED DREDGING-MACHINE.

Specification forming part of Letters Patent No. 19,908, dated April 13, 1858; Reissue No. 3,028, dated July 14, 1868.

*To all whom it may concern:*

Be it known that I, E. B. BISHOP, of the city of New Orleans, parish of Orleans, and State of Louisiana, have invented a certain new, useful, and Improved Machine for Deepening the Channels of Harbors and Rivers, and for accomplishing other like or analogous objects; and I do hereby declare the following to be a full, clear, and exact description of the same, reference being had to the annexed drawings, making a part of this specification, in which—

Figure 1:
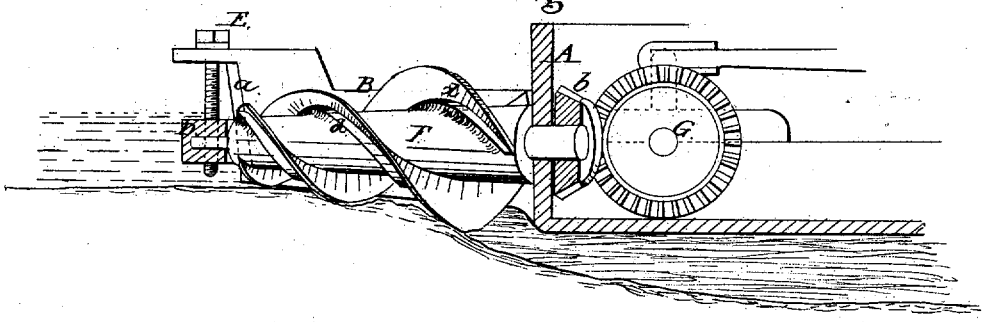
Figure 2:
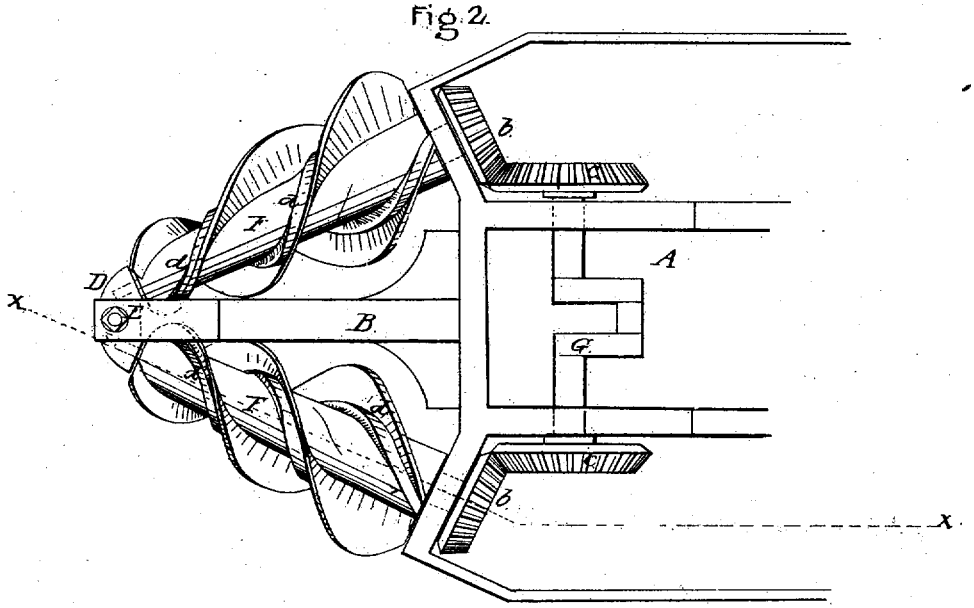

Figure 1 is a vertical section in the line *x x* of Fig. 2, the revolving excavator, however, not being bisected; and Fig. 2, a plan or top view of my invention in one of its most useful, although not simplest, forms of arrangement and construction.

Before I proceed to indicate the distinctive nature of my invention, or to enter upon a detailed description of its construction or the principle on which it operates, it is necessary, in order to bring into prominent relief and view its very great value and importance, for me to advert briefly to the fact that dredging-machines as heretofore constructed have all, without exception, operated on one and the same theory or plan, to wit, that it is necessary, in order to make or deepen a channel, to dig up the earth by means of peculiarly-constructed scoops or buckets that are worked by the agency of chains and adjustable arms or beams, which, from their very nature, cannot operate continuously, but only at irregular intervals, and in a very slow and tedious manner. The operation of making an excavation or channel, therefore, by these machines is exceedingly expensive, even when no extra boats or scows are employed in connection with them to take off the earth, after it is dug up by the scoops, to some out of the way locality, and such extra boats are always necessary, except in digging or deepening canals. And if the bar through which a channel is to be cut or made deeper is the result, in whole or in part, of sedimentary depositions, as is the case with the bar at the mouth of the Mississippi River, no channel can be made with these machines, for the reason that they proceed so slowly that the excavation they make is filled up nearly, if not quite, as fast as they advance across the bar. This has been repeatedly demonstrated by actual experiments made in behalf of the Government of the United States by skillful and experienced government officers. Hence it is that the bar at the mouth of the Mississippi River (as well as many others along its course and at the mouths and entrances of many other American rivers and harbors) remains in its original state to hinder, obstruct, and delay the commerce and navigation of the country, and to the precise extent of the subtraction thus made from the profits of this important branch of industry is the positive loss sustained by the American people.

To abate this enormous evil and relieve the country of the never-ending tax to which these bars subject its commerce and navigation—that is to say, to create a machine which, constructed and operating upon an entirely new principle, shall work continuously and rapidly, and thus not only open channels through bars, but keep them permanently open, no matter where they may be, nor what amount of sediment may be precipitated in them—has been my object, and I have obtained this object by rejecting all existing arrangements and plans of construction, and making my dredging-machine upon an entirely new principle, so far at least as the mode of its operation is concerned.

My invention, in a word, consists of a revolving excavating apparatus that is carried by a rapidly-moving steamboat at the bow or stern, or at both the bow and stern of the said boat, the connection being secured by any suitable means, but always in such manner as to allow or provide for an elevation and depression of the revolving excavator in order that it may always be adjusted promptly with reference alike to its cut at each revolution, and to the increasing depth of the water as the excavation proceeds.

But my invention will be better understood by referring to the drawings, which present two views of my revolving excavator when in the form of two tapering screws that are placed at an angle to each other, but with their points or front extremities very near together, as is clearly shown on the drawings. These screws are connected with the boat at its bow, or in such manner as that the screws project in front of the bow, and they are rotated by an independent engine on the boat, by which I mean an engine that is distinct from the engine that is used for the propulsion of the boat. In fact, in any form of my invention, an independent engine should be employed to work it.

In the form as shown the operation of my invention is as follows, to wit: The boat is put in motion across the bar in which a channel is to be made or deepened, and the screws are rapidly revolved in reverse directions to each other. If the earth of which the bar is composed be of soft and yielding character, the screws may be adjusted so as to cut at each revolution an inch or more into the same; but if the composition of the bar be of a hard and tenacious nature not more than half that much can be cut at one revolution without danger of reducing the speed of the screws and boat, which should never be permitted, for the effect produced does not depend on the positive cutting of the screw much more than it does upon the action of the strong currents and violent agitation of the water which is produced by the rapid revolution of the screws, and which, therefore, by sheer force of attrition or abrasion helps powerfully to attain the desired end.

Any suitable gearing may be used for giving motion to the screws, and any proper mechanical means may be employed for adjusting them at the proper depth and angle, which adjustment may be made only once for each crossing of the bar by the machine, or it may be made during the progress of the boat at every crossing, accordingly as the one or the other plan shall be found most advantageous in the actual operation or practice of the machine. The boat being kept in motion until the bar has been traversed, it is obvious that a channel or excavation of a depth of several inches will have been made, and that all the earth that has been cut up by the excavator or removed by the agitation of the water will have been thrown upon either side of this channel, or washed away by the natural current, if there be such a current across the bar.

The next proceeding is to adjust the screws to the increased depth of the water in the cut or channel just made, and then to rush the machine back again to the starting-point, and so on until by repeated crossings a channel of the desired or required depth is established. If there be no sediment in the water on the bar, and no opposing or diverse currents and eddies to re-form the bar or fill up the channel after the channel has been once opened, the machine is no longer wanted there; but if, from the above or other causes, the channel is likely to be filled up the machine must be kept permanently near at hand, and at such intervals as experience may show to be proper it must be driven through the channel in order to guard against this contingency of filling up.

Although I have shown this form as being an exceedingly efficient one, it is obvious that my rotating excavator may be modified into a great variety of forms; that it may be tapering or not; that it may be of double or single form—that is to say, that one rotating excavator, or two, or even more, may be used at either or both ends of the boat to which it is attached—and that it may be made to operate entirely through the agitation of the water on bars of very yielding earth, and without touching the same at all by the excavator.

It will also be seen that although designed exclusively for the making or deepening of channels, my invention would make an admirable ice-breaker in some of the forms in which it may be made.

Having thus described my invention, what I claim, and desire to secure by Letters Patent, is—

A revolving excavator or dredging-machine constructed and operating substantially as and for the purposes set forth.

E. B. BISHOP.

Witnesses:

H. N. JENKINS,

RUFUS R. RHODES.